(12) United States Patent
Melzer et al.

(10) Patent No.: US 9,311,203 B2
(45) Date of Patent: Apr. 12, 2016

(54) CIRCUIT ARRANGEMENT AND METHOD FOR TESTING SAME

(75) Inventors: Lars Melzer, Dresden (DE); Volker Aue, Dresden (DE)

(73) Assignee: Intel Deutschland GmbH, Neubiberg (DE)

( * ) Notice: Subject to any disclaimer, the term of this patent is extended or adjusted under 35 U.S.C. 154(b) by 504 days.

(21) Appl. No.: 13/567,141

(22) Filed: Aug. 6, 2012

(65) Prior Publication Data

US 2013/0042143 A1    Feb. 14, 2013

(30) Foreign Application Priority Data

Aug. 11, 2011   (EP) ..................................... 11177200

(51) Int. Cl.
*G06F 11/22* (2006.01)
*G06F 11/267* (2006.01)

(52) U.S. Cl.
CPC .................................. *G06F 11/267* (2013.01)

(58) Field of Classification Search
CPC .... G06F 11/22; G06F 11/2205; G06F 11/273
USPC ............................................... 714/30, 37, 45
See application file for complete search history.

(56) References Cited

U.S. PATENT DOCUMENTS

| | | | | |
|---|---|---|---|---|
| 7,185,293 | B1 * | 2/2007 | Ofer ................................. | 326/38 |
| 7,917,820 | B1 * | 3/2011 | Pavle et al. ..................... | 714/727 |
| 8,138,778 | B1 * | 3/2012 | Smith ....................... | 324/756.02 |
| 2002/0085215 | A1 * | 7/2002 | Iida ................................ | 358/1.2 |
| 2003/0204782 | A1 * | 10/2003 | Schutt et al. .................... | 714/30 |
| 2004/0059535 | A1 * | 3/2004 | De Jong et al. ............... | 702/118 |
| 2004/0201590 | A1 * | 10/2004 | Wu et al. ........................ | 345/519 |
| 2004/0225459 | A1 * | 11/2004 | Krishnaswamy et al. ...... | 702/57 |
| 2005/0015669 | A1 | 1/2005 | Duron et al. | |
| 2005/0154550 | A1 * | 7/2005 | Singh et al. ................... | 702/108 |
| 2005/0154551 | A1 * | 7/2005 | Pramanick et al. ........... | 702/119 |
| 2008/0317025 | A1 * | 12/2008 | Manula et al. ................ | 370/389 |
| 2009/0105983 | A1 * | 4/2009 | Variyam et al. ............... | 702/124 |
| 2009/0204849 | A1 * | 8/2009 | Shimura ......................... | 714/27 |
| 2010/0007366 | A1 * | 1/2010 | Watanabe et al. ............. | 324/763 |
| 2010/0283505 | A1 * | 11/2010 | Koch et al. ..................... | 326/41 |
| 2011/0055449 | A1 * | 3/2011 | Koch et al. .................... | 710/306 |
| 2011/0284312 | A1 | 11/2011 | Aizawa et al. | |

FOREIGN PATENT DOCUMENTS

EP             2351681 A1     8/2011

\* cited by examiner

*Primary Examiner* — Chae Ko
(74) *Attorney, Agent, or Firm* — Eschweiler & Associates, LLC

(57) ABSTRACT

The invention relates to a circuit arrangement and to a method for testing same. A circuit arrangement is provided that includes a plurality of functional units which are coupled by at least one streaming data bus. Each of the functional units includes a plurality of hardware modules and a switch matrix. At least one of the streaming data busses is provided with a data width of at least that of the widest hardware module of any of the functional units of the circuit arrangement. The switch matrices are configurable to establish a streaming data path between and through the plurality of functional units which is used as a test link for any of the hardware modules of the circuit arrangement. The invention provides for non-intrusive real-time tracing in SoCs with a minimum of additional hardware resources and at low cost in terms of die size and power consumption.

17 Claims, 7 Drawing Sheets

CIRCUIT ARRANGEMENT AND METHOD FOR TESTING SAME

REFERENCE TO RELATED APPLICATION

This application claims priority to European patent application number 11177200.0 filed on Aug. 11, 2011.

FIELD

The invention relates to a circuit arrangement and to a method for testing the circuit arrangement. More particularly the invention relates to test and real-time trace of systems on chips (SoCs).

BACKGROUND

Debug and trace tools and techniques play an exceptionally important role at all stages of design of integrated circuitry. Debugging complex Systems on a Chip (SoC) requires the observability of internal signals at speed. This needs to be possible without any influence on the real time behavior of the SoC.

Modern telecommunications modems require complex Systems-on-Chip (SoC) solutions and they are very hard to debug if the system does not provide dedicated debug and trace capabilities. Typically, a modem is implemented using one or more processor cores that control additional computational logic.

Debugging typically refers to the detection and resolution of behavioral flaws of the software running on the embedded cores. For debugging, special test modes are implemented in the SoC.

Traditional debug and software based tracing techniques can be often unacceptably invasive, burdensome or impractical. Current hardware assisted tracing techniques help, but there are still many limitations. Also, a system wide approach is necessary to analyze the interoperations between the many processing agents and the complex infrastructure on an SoC. When debugging the embedded software, the SoC is most likely not working at speed, and parts of the SoC are isolated for better controllability and observability (measure for how well internal states of a system can be inferred by knowledge of its external outputs). Controllability and observability are dual aspects of the same problem.

In order to assist the implementer with identifying programming or implementation flaws on a system level, modern implementations include several trace features.

Trace features allow observability of internal signals in a normal operation mode whereas the normal function is not influenced by the trace.

One example of a conventional trace architecture is ARM's CoreSight® architecture, see e.g. at http://wvvw.arm.com/products/system-ip/debug-trace/coresight-architecture.php. In a typical System-on-Chip implementation, the Core-Sight® infrastructure includes a debug subsystem and a trace subsystem. Each processing element (DSP, CPU etc.) can be paired with an instruction/data trace IP block (ETM—Embedded Trace Module) or program (PTM) trace IP block, enabling it to generate trace information about executed instructions or program flow respectively. This architecture, however, requires much additional logic such as a trace arbiter and ETMs, many multiplexers, additional large buses and large wiring overhead. So the main disadvantage of this approach is the additional hardware cost of the additional trace circuitry.

In summary, a deficiency of the prior art is that both test and trace features need additional dedicated hardware resources which are consuming extra power and increase the cost by increasing the die size of a chip, while the challenge remains that the system behavior must not be influenced by real time tracing.

SUMMARY

The invention provides a method for testing circuit components which requires a minimum of additional test hardware and wiring so to provide for less power consumption and less chip area required. The invention also provides a non-intrusive method for test and real-time trace for systems on a chip (SoCs), i.e. a method that does not influence system behavior by real time tracing operation.

According to a first aspect a circuit arrangement comprising a plurality of functional units that are coupled by at least one streaming data bus is provided. Each of the functional units comprises a plurality of hardware modules and a switch matrix. The switch matrix has at least one streaming data input and at least one streaming data output and is connected between a streaming data input and a streaming data output of the respective functional unit and is further coupled to each of the hardware modules so that by configuring the switch matrix a streaming data path is established between and through the plurality of functional units. At least one of the streaming data busses has a data width of at least that of the widest hardware module of any of the functional units of the circuit arrangement so that it may be configured as a test link for any of the hardware modules of the circuit arrangement.

In one embodiment the plurality of functional units of the circuit arrangement are coupled by a single streaming data bus, and the switch matrices of the functional units are configurable to connect a single one of the hardware modules that is to be tested between the single streaming data input and the single streaming data output while detouring all of the other hardware modules of all functional units of the circuit arrangement.

In another embodiment the plurality of functional units of the circuit arrangement are coupled by a first and a second streaming data bus, and at least one of the streaming data busses has a data width of at least that of the widest hardware module of any of the functional units of the circuit arrangement, for use as a test link. In this embodiment the switch matrices are configurable to connect a single one of the hardware modules to be tested between the second streaming data input and the second streaming data output while detouring all of the other hardware modules of all functional units of the circuit arrangement.

In the embodiment of the circuit arrangement with a first and a second streaming data bus, the switch matrices are also configurable to establish a first streaming data path for streaming processing data through the circuit arrangement and to establish a broadcast connection at an output of a module to be tested so that downstream of the module to be tested, streaming data are supplied to both the first streaming data path for normal processing operation, and to the second streaming data bus for detecting test data from the module to be tested under real-time processing conditions at a trace output of the second streaming data bus.

The hardware modules may be any of a group comprising hardware accelerators, local memory and local processors.

According to a second aspect there is provided a method for testing a circuit arrangement which has a plurality of functional units that are coupled by at least one streaming data bus, wherein each of the functional units comprises a plurality of hardware modules and a switch matrix that has at least one streaming data input and at least one streaming data output and is connected between a streaming data input and a streaming data output of the respective functional unit and is further coupled to each of the hardware modules. The method comprises providing at least one of the streaming data busses with a data width of at least that of the widest hardware module of any of the functional units of the circuit arrangement, configuring the switch matrices of the circuit arrangement to establish a streaming data path between and through the plurality of functional units, and using the streaming data path as a test link for any of the hardware modules.

In a case where the plurality of functional units are coupled by a single streaming data bus the method further comprises configuring the switch matrices of the circuit arrangement to establish a streaming data path that passes from the single streaming data input through a single one of the hardware modules that is to be tested and to the single streaming data output while detouring all of the other hardware modules of all functional units of the circuit arrangement, feeding a test sequence from the input to the hardware module to be tested, and detecting test data at the output.

In a case where the plurality of functional units are coupled by a first and a second streaming data bus the method further comprises providing the second streaming data bus with a data width of at least that of the widest hardware module of any of the functional units of the circuit arrangement, for use as a test link. As with the case of a single streaming data bus, the testing method may further comprise configuring the switch matrices to connect a single one of the hardware modules to be tested between the second streaming data input and the second streaming data output while detouring all of the other hardware modules of all functional units of the circuit arrangement, feeding a test sequence from the second input to the hardware module to be tested, and detecting test data at the second output.

In one embodiment, in case of a first and a second streaming data bus being provided, the testing method may comprise testing a hardware module under real-time processing conditions. In that case the method further comprises configuring the switch matrices to establish a first streaming data path and streaming processing data through the first streaming path, and configuring the switch matrices to establish a broadcast connection at an output of a module to be tested to supply streaming data downstream the module to be tested to the first streaming data path for normal processing operation, and to the second streaming data bus. The method also comprises detecting test data from the module to be tested under real-time processing conditions at a trace output of the second streaming data bus.

In configuring the switch matrices of each individual processing unit, the configuration of each switch matrix may be controlled by a local processor such as a DSP or a RISC that constitutes a component of that processing unit. The local processor in turn can be controlled by firmware. In another embodiment, the configuration of the switch matrices of the individual processing units may be controlled by a controller of the circuit arrangement external to the functional units, thus offering the possibility of testing even a local processor that constitutes a component of any processing unit of a circuit arrangement. In an application example in which the circuit arrangement represents an LTE physical layer subsystem of a telecommunications device, configuration of the switching matrices of the individual processing units for test/trace purposes may be controlled by the main controller.

The provided solution enables real time tracing on streaming based, data driven architectures. It combines circuit architecture features, streaming broadcast features and a dedicated multi-purpose test link with a minimum of hardware overhead and simplicity of integration to add real time trace capabilities while ensuring observability and controllability. That is, the streaming based trace approach does not influence the behavior of the system and consumes little power, requires less chip area compared to known tracing approaches and is easy to extend and to adapt.

BRIEF DESCRIPTION OF THE DRAWINGS

Additional features and advantages of the present invention will be apparent from the following detailed description of specific embodiments which is given by way of example only and in which reference will be made to the accompanying drawings, wherein.

DETAILED DESCRIPTION

Figure 1:
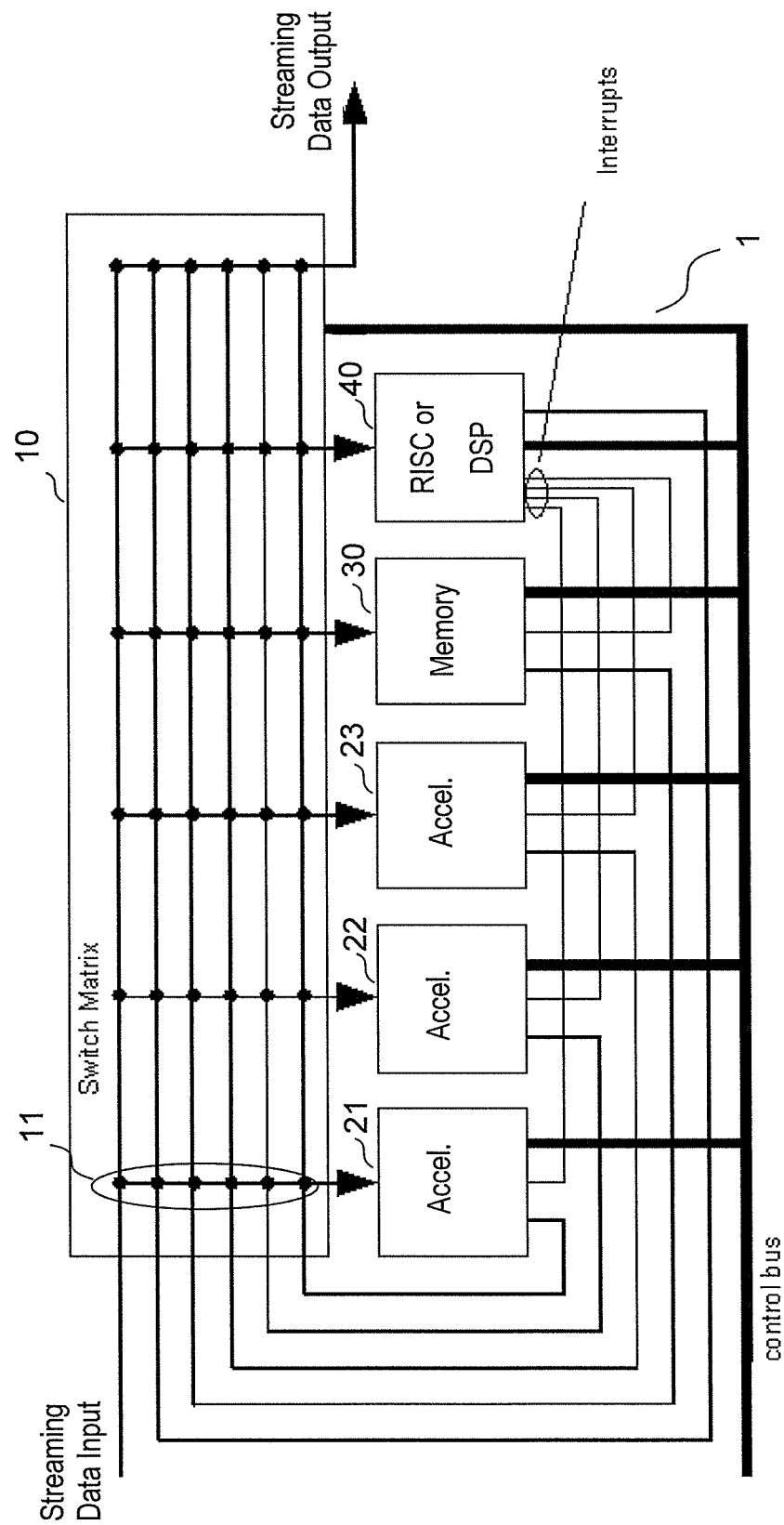
FIG. 1 illustrates the generic architecture of a functional unit of a circuit arrangement according to one embodiment.

FIG. 1 illustrates the generic architecture of a functional unit of a circuit arrangement according to one embodiment. This generic architecture of a functional unit has already been proposed for a telecommunications modem as disclosed in the applicant's co-pending European patent application "Modem Architecture" (EP 10 197 313.9). The functional units are components of a system-on-chip (SoC). To give an application example, the functional units may constitute components of an LTE layer subsystem of a telecommunications device, in which case the functional units may be any of a digital front end (DFE) unit, LTE Tx unit, shared RAM unit, forward error correction (FEC) data unit, fast Fourier transform (FFT) unit, parameter estimation unit, searcher unit, and FEC control unit, without being limited thereto.

A functional unit 1 as represented in FIG. 1 comprises a plurality of hardware modules which may include a local RISC or digital signal processor, as shown at 40, a plurality of hardware accelerators 21-23, and, optionally, a memory module 30. Also, each of the functional units comprises a switch matrix 10 connected between a streaming data input of the respective functional unit and each of the sub-components or modules. Each column of six points, as exemplified by reference numeral 11, may be understood as a seven point switch wherein the points represent potential connection points. The switch matrix can be configured at run time. Local processor 40 is adapted to receive task instructions from a higher level controller over a control bus system using a first protocol. The first protocol includes addressing and may be a AHB based protocol. The local processor 40, in response to the task instructions from the controller, may be adapted to configure hardware modules 21-23, 30 and switch matrix 10 to selectively produce connections between the streaming data input and the sub-components or modules in a manner to perform the dedicated task on the data that are streamed through the functional unit on a streaming data path as defined by the switch matrix. It should be noted here that the presence of processor 40 is optional and that, if provided, the connection thereof to the switch matrix is optional. In another embodiment of the invention the configuration of the switch matrix of an individual processing unit may be controlled by a controller of the circuit arrangement external to that functional unit which case even offers the possibility of testing a local processor that constitutes a component of this processing unit. In yet another embodiment of the invention a functional unit can be provided without a local processor which is the case in the embodiment shown in FIG. 4, or, in another embodiment, a functional unit can be provided that includes a local processor which however need not be connected to the switch matrix.

For streaming data through a functional unit and between several functional units of a circuit arrangement, a handshake based data streaming protocol is used. One embodiment of the invention uses the data streaming protocol as illustrated in FIG. 10 and described in the applicant's co-pending European patent application "Method for High Speed Data Transfer" (EP 10 197 315.4). It comprises three binary signals including a valid and an accept signal for handshaking between a data source and a data sink, and a frame signal which marks the beginning and the end of a logical group of data elements within a data stream. Further details will be described below in conjunction with FIGS. 6-9.

Figure 2:
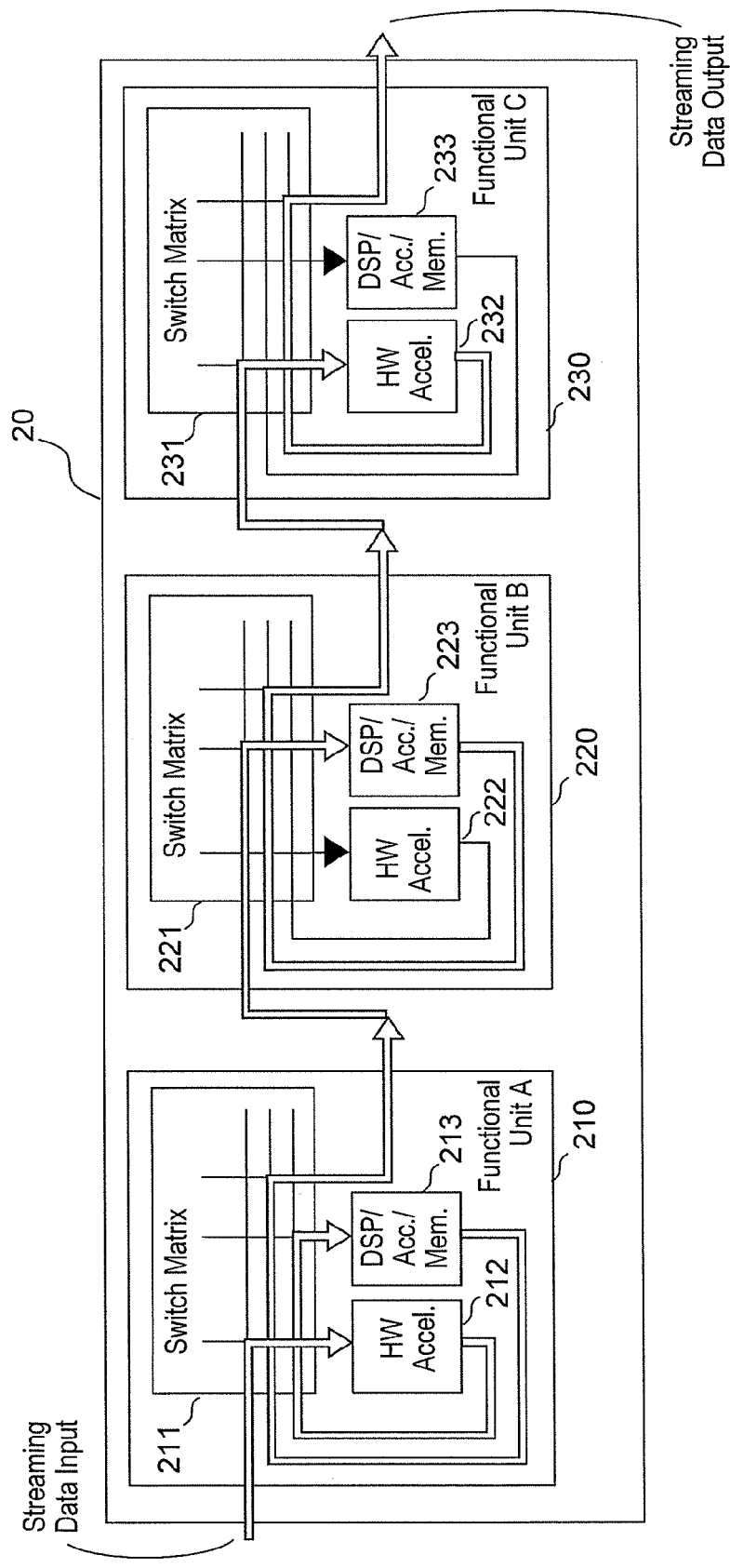
FIG. 2 shows a circuit arrangement according to one embodiment.

Generally, by using switchable matrices the point-to-point connections between hardware modules of a functional unit can be changed. FIG. 2 illustrates a circuit arrangement 20 according to one embodiment of the invention. Circuit arrangement 20 comprises three functional units, 210, 220, 230, which are designed similar to that illustrated in FIG. 1. Each of the functional units 210, 220, 230 comprises hardware modules 212, 213; 222, 223; and 232, 233, respectively, and a switch matrix, 211; 221; 231, respectively, that is coupled between a respective streaming data input of the respective functional unit and each of the hardware modules of the respective functional unit. Switch matrices 211, 221, 231 are configurable to provide a continuous streaming data path between the functional units and through each of the functional units passing selected one of the hardware modules and detouring others, according to the configuration defined by the switch matrices. A streaming data path of a specific operational example is represented in FIG. 2 by hollow arrows. As can be seen in the figure, the data stream passes from the streaming data input of circuit arrangement 20 into functional unit 210, through switch matrix 211 thereof to hardware accelerator 212, then again through switch matrix 211 to hardware module 213, again through switch matrix 211 and out of functional unit 210 to functional unit 220. In functional unit 220, the data stream passes through switch matrix 221 thereof to hardware module 223, and again through switch matrix 221 to the output of functional unit 220, and detouring hardware module 222. From the output of functional unit 220, the data stream passes into functional unit 230, into the switch matrix 231 thereof, from there through hardware module 232, and again through switch matrix 231 to the output of functional unit 230 and the output of the circuit arrangement 20.

In circuit arrangement 20, the functional units are coupled by a single streaming data bus, so according to the disclosure this streaming data bus is provided with a data width of at least that of the widest hardware module of any of the functional units of the circuit arrangement so that it can be configured as a test link for any of the hardware modules.

Figure 3:
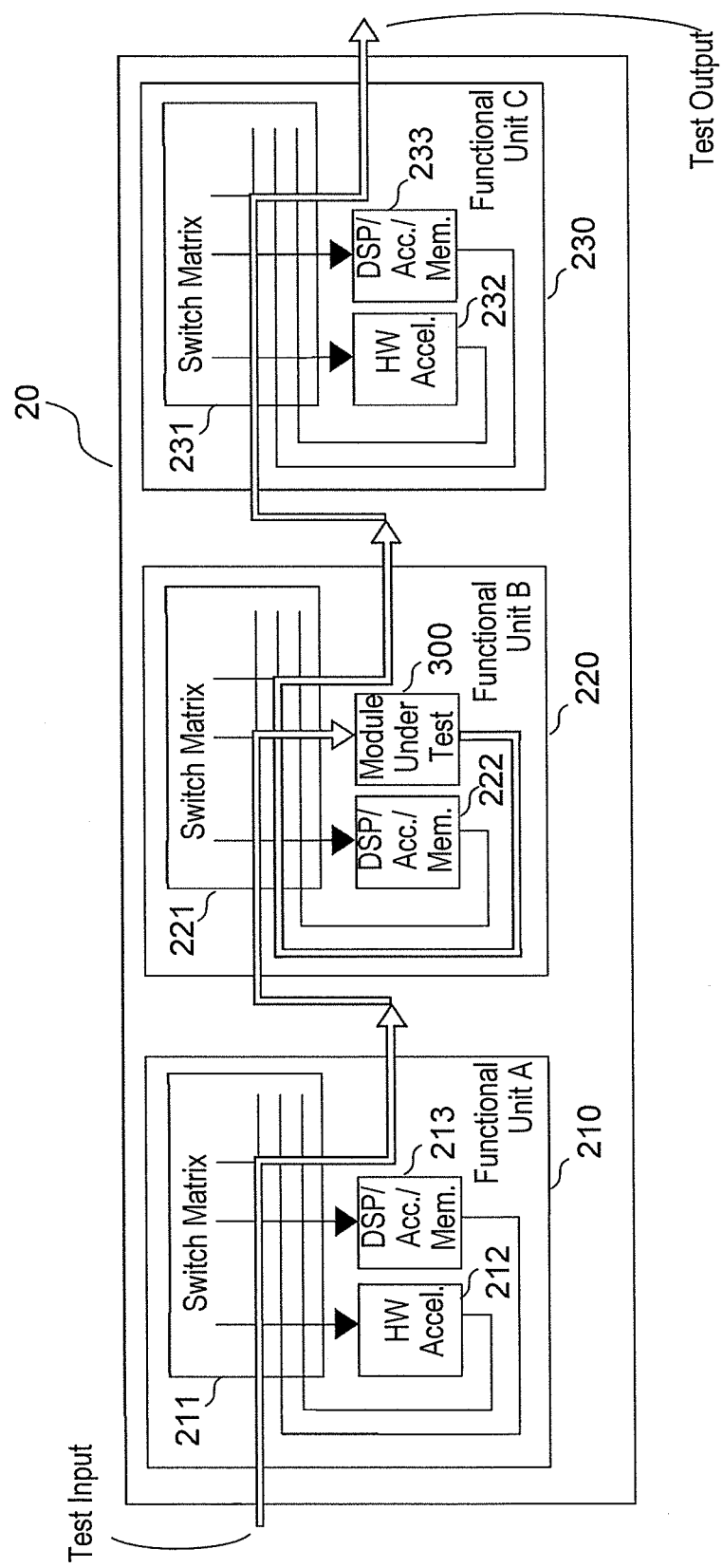
FIG. 3. illustrates an operational example of a test method according to one embodiment in the circuit arrangement of FIG. 2.

FIG. 3 illustrates an operational example of a test method according to one embodiment of the invention in the circuit arrangement of FIG. 2. As can be seen in the figure, switch matrices 211, 221, 231 are configured such as to connect hardware module 300 (in functional unit 220) which is the module to be tested between the single streaming data input and the single streaming data output of circuit arrangement 20 while detouring all of the other hardware modules of all functional units of the circuit arrangement. So a test sequence can be supplied to hardware module 300, and test data can be detected at the output of circuit arrangement 20. Otherwise stated, a test on an MuT (Module under Test) can be performed by generating external stimuli and evaluating the MuT's behavior at the output of the circuit arrangement while the MuT is isolated from the rest of the circuit arrangement, and is controllable and observable.

Figure 4:
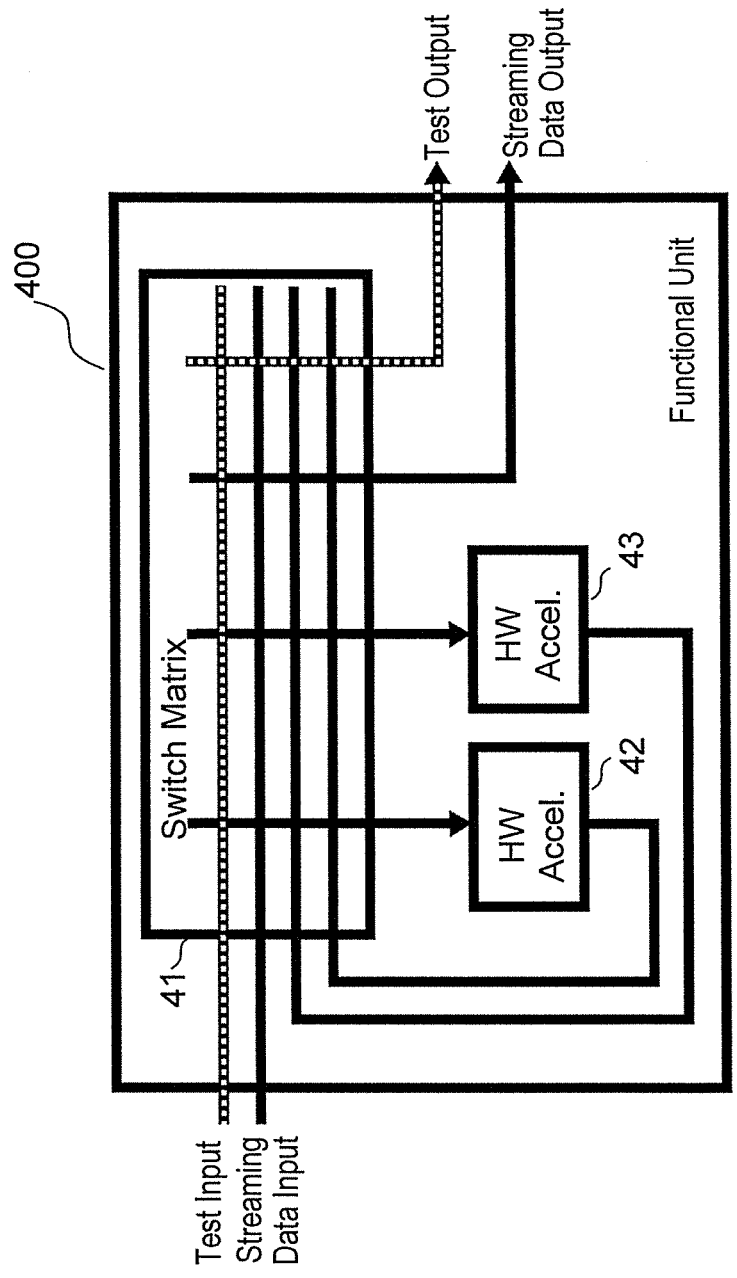
FIG. 4. illustrates the generic architecture of a functional unit of a circuit arrangement according to another embodiment.

FIG. 4 illustrates the generic architecture of a functional unit 400 of a circuit arrangement according to another embodiment. Functional unit 400 is similar to the functional units described above with reference to FIG. 2 and FIG. 3. Additionally, functional unit 400 comprises a second streaming data bus which provides a multi-purpose streaming link and will be referred to as a 'test link' below. As can be seen in the figure, the test link requires an additional streaming data test input and output to functional component 400 and switch matrix 41.

In this embodiment, the test link may have the following purposes:
(1) isolate the MuT in test mode;
(2) Provide test data directly to the MuT by connecting the inputs via the test link and switching matrices to the primary inputs of the circuit device or another data source, so ensuring controllability of the MuT;
(3) Provide the output data of the MuT directly to the primary output or another data sink by routing them through the test link and the switch matrices, so ensuring observability of the MuT; and/or
(4) Trace output data of the MuT to the primary output in an operational mode of the circuit device so providing for validation of an MuT.

Tracing herein is intended to refer to a way for debugging which may be performed e.g. by recording output data from an MuT in trace memory, generating reference data for the MuT and comparing the output data with the reference data.

Obviously, with the architecture as shown in FIG. 2, it would be quite difficult to provide trace data to an MuT or to observe undistorted output data of the MuT under real-time operation conditions of the circuit arrangement as both input and output data have to pass other processing modules which would modify the data.

Figure 5:
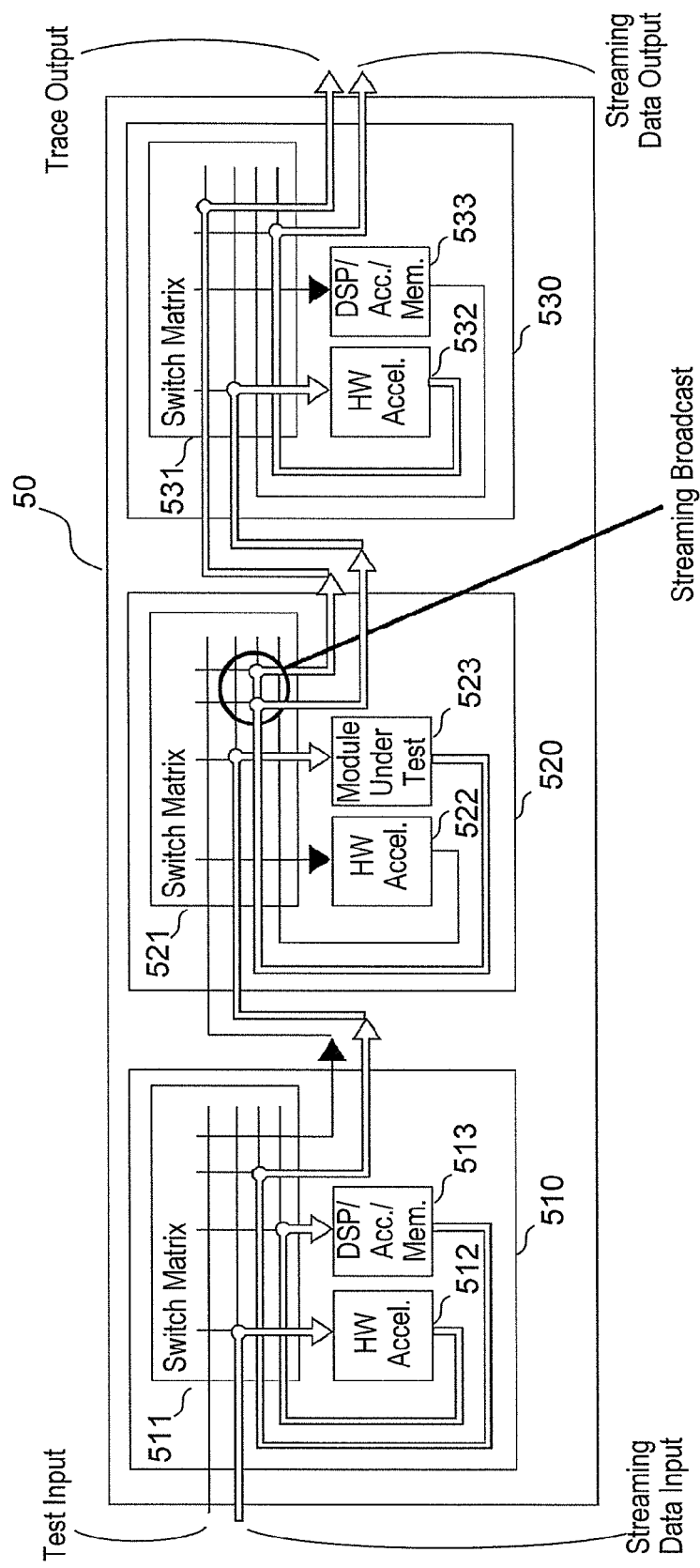
FIG. 5. illustrates an operational example of a test method in a circuit arrangement comprising functional units as shown in FIG. 4, including real-time tracing.

FIG. 5 illustrates an operational example of a real-time tracing procedure in a circuit arrangement comprised of functional units as shown in FIG. 4.

In the circuit arrangement of FIG. 5, all hardware modules can be connected to the test input via the switch matrices, and all module outputs can be connected to the test output via the switch matrices. So test data can be provided via the additional test link directly to an MuT 523 without a devious route through other hardware modules, in similar manner as shown in FIG. 3 which however uses the single streaming data bus for test purposes.

The major advantage of the embodiment with the additional test link is that it can also be used for data tracing in the functional mode of the circuit device. The trace functionality is enabled by combining the test link with a streaming data broadcast feature which is described in the applicant's co-pending EP application 10153465.9 entitled "Method and device for synchronizing data broadcasts", and which is hereby incorporated by reference.

Apart from the hardware effort for the broadcast implementation within the switch matrix, which will be described below with reference to FIG. 6, this feature comes almost for free because the test link is already there for test purposes. In the functional mode, the test link is not allocated and can be used for trace exclusively. This means, the real time behavior of the system is not affected or influenced in any case. Tracing data using the new approach enables observability of all modules' inputs and outputs that are connected to a switch matrix.

In the operational example of FIG. 5, data of hardware module 523 of functional unit 520 are traced. Switch matrices 511, 521, and 531 are configured so that a first streaming data path is established similar to that illustrated in FIG. 2. Additionally, switch matrices 511, 521 and 531 are configured so that a broadcast connection is established at the output of the MuT 523. Thus, downstream MuT 523 the streaming data are supplied to the first streaming data path for normal processing operation, and are also supplied to the test link which supplies that data directly to a trace output of the circuit arrangement in detouring any further hardware modules.

Figure 6:
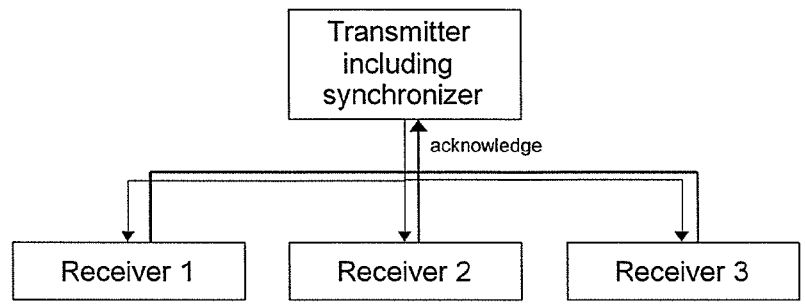
FIG. 6 illustrates basic aspects of a data broadcasting scenario.
Figure 7:
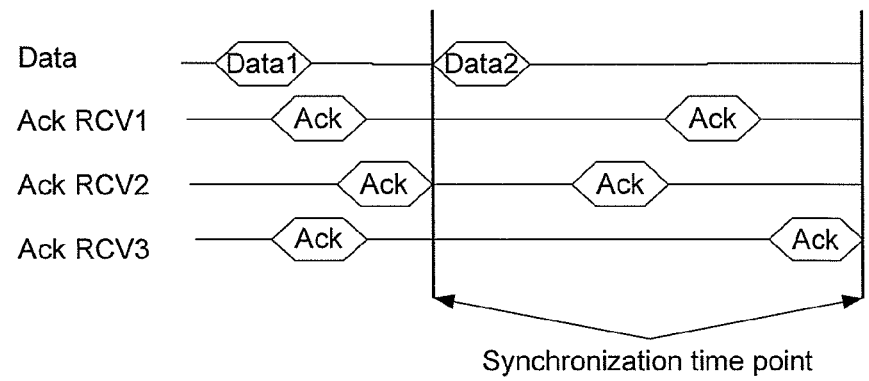
FIG. 7. illustrates signal flow in the data broadcasting scenario of FIG. 6.

FIG. 6 illustrates basic aspects of a data broadcasting scenario as used according to the invention, and FIG. 7 illustrates the signal flow in the data broadcasting scenario of FIG. 6. Most generally stated, data streams are to be broadcasted by a transmitting unit to a plurality of receiving units. Each data stream to a respective receiver has a different speed and each receiver acts independently, so the acknowledge latency is not predictable. The transmitter has to ensure that all receivers have received the first data word before the second data word is delivered. In FIG. 7, after the transmitter has broadcasted a first data word, data1, it first receives an acknowledge message from receivers 1 and 3, "Ack RCV1"; "Ack RCV3" followed by an acknowledge message from receiver 2, "Ack RCV2". Once, acknowledge messages have been received from all receivers, the transmitter broadcasts a second data word, data2, and then again waits for acknowledge messages from the receivers.

For detecting the moment when acknowledge messages have arrived from all receivers, it has been proposed to include a synchronizer module in the transmitter, wherein the synchronizer collects all acknowledge messages from the receivers and generates an indication when the next data can be transmitted, as described in the applicant's co-pending European patent application entitled "Method and device for synchronizing data broadcasts" (EP10153465.9).

Figure 8:
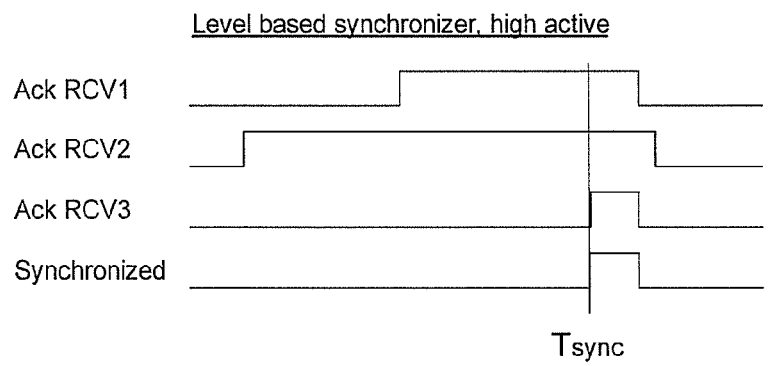
FIG. 8 illustrates one embodiment of broadcast synchronization.

FIG. 8 illustrates one embodiment of broadcast synchronization in which the synthesizer is level based, e.g. when a receiver receives a data word, its ACK signal goes to a high level. Synchronization is reached when all acknowledge signals from the receivers are "high". This is illustrated in FIG. 8 at time Tsync. The implementation of the synchronizer is really simple, if the acknowledge message is transmitted on a 1-bit line. In that case, the synchronizer may comprise a logical gate, for example, a logic AND gate. When all three ACK signals, Ack RCV 1-3 of FIG. 8 have been received, the AND gate outputs a "1" meaning all acknowledgements have been detected and the next data word can be transferred.

Figure 9:
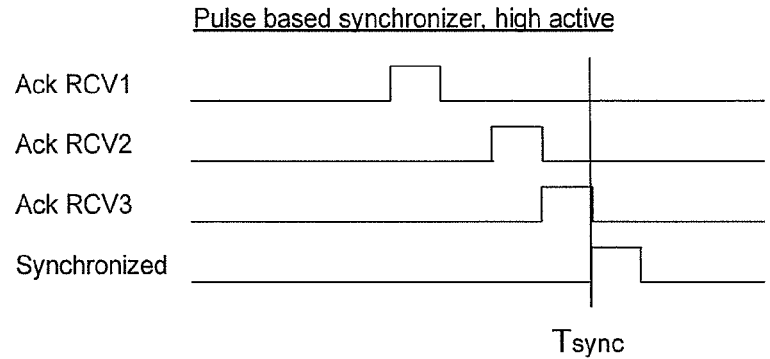
FIG. 9 illustrates another embodiment of broadcast synchronization.
Figure 10:
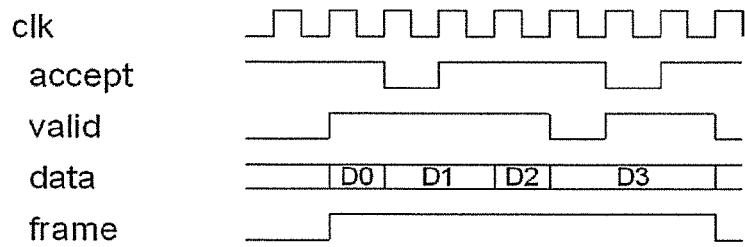
FIG. 10 illustrates one example of the signal forms of a streaming data transfer protocol.
Figure 11:
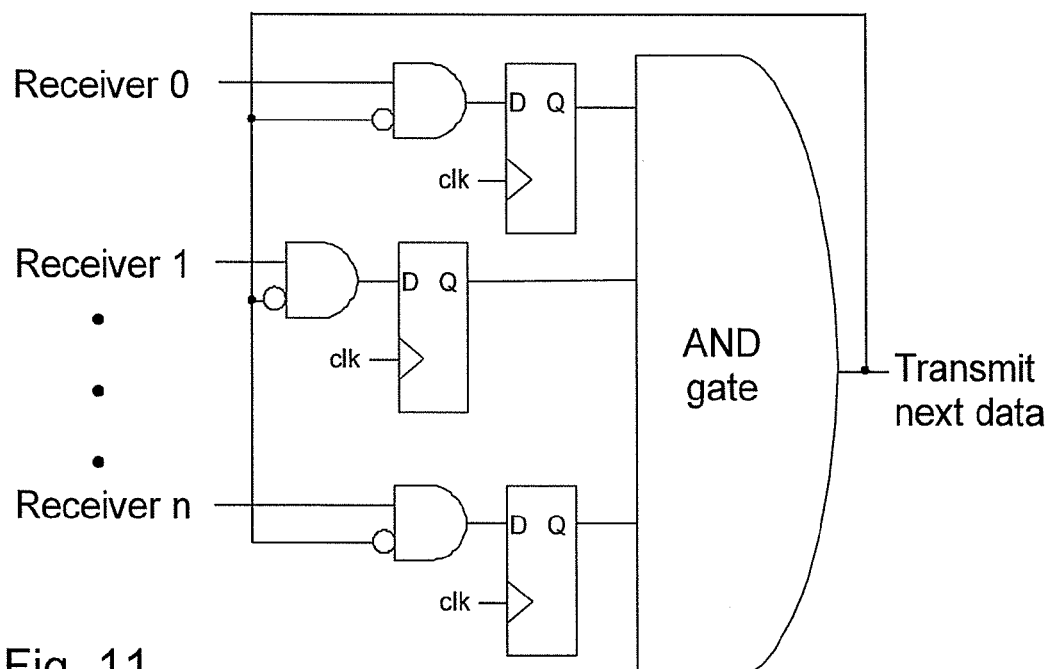
FIG. 11 shows an implementation of a synchronizer.

FIG. 9 illustrates another embodiment of broadcast synchronization in which the receivers acknowledge by a high active pulse. In this case, the synchronizer has to capture these pulses. Synchronization is done, when all pulses are captured which is illustrated in the figure at time Tsync. One implementation example of a synchronizer for this case is shown in FIG. 11. A small edge detection unit or state machine is added in each Ack input path which traps each pulse, and the outputs thereof are "AND"-ed to detect when the next data word can be transferred.

FIG. 10 illustrates one example of the signal forms of a streaming data transfer protocol that can be used with the invention; and FIG. 11 shows an implementation of a synchronizer that can be used with the invention.

FIG. 10 shows the streaming signals used for data transfer through a plurality of functional units of an SoC according to one example. This streaming data transfer protocol comprises four signals: data, valid, accept, and frame. The valid/accept signals are similar to that from other handshake-based transfer protocols and are used to drive and stall the communication from source to sink. Source and sink can set or reset these signals at any time. Data is taken over if both are "high" on the rising edge of the clock. Data source and data sink must have the same understanding of what the frame signal means. Data source and data sink, herein, can be any of the functional units of an SoC. A 'frame' in the sense of this transfer protocol is a logical group or sequence of data, such as e.g. an OFDM symbol, a block of control data, a block of information data, etc.

Used in conjunction with the method for synchronizing data broadcast as described above, the transmitter of FIG. 6 corresponds to a data source and receivers 1-3 correspond to a data sink. The data frame consisting of data elements D0, D1, D2, D3, in FIG. 10 is equivalent to a data word, data1 or data2, in FIG. 7. The accept signal of FIG. 10 corresponds to acknowledge signals Ack RCV1 . . . Ack RCV3 of FIG. 7.

When used in conjunction with the invention, the above data broadcast synchronizer will be implemented in each of the switch matrices 511, 521, and 531 of the embodiment shown in FIG. 5. It will be understood that the invention is not limited to be used in conjunction with this particular transfer protocol but can generally be used with any handshake-type data streaming protocol.

What is claimed is:

1. A circuit arrangement comprising:
a plurality of functional units that are coupled together by at least one streaming data bus, wherein each of the functional units comprise a plurality of hardware modules and a switch matrix, wherein the switch matrix has at least one streaming data input and at least one streaming data output and is connected between a streaming data input and a streaming data output of the respective functional unit and is further coupled to each of the hardware modules of the respective functional unit so that by configuring the switch matrix a streaming data path is established between and through the plurality of functional units;
wherein at least one of the at least one streaming data bus has a data width of at least that of the widest hardware module of any of the functional units of the circuit arrangement to be configurable as a test link for any of the hardware modules.

2. The circuit arrangement of claim 1, wherein the plurality of functional units are coupled together by a single streaming data bus, and wherein the switch matrices are configurable to connect a single one of the hardware modules that is to be tested between the single streaming data input and the single streaming data output while detouring all of the other hardware modules of all functional units of the circuit arrangement.

3. The circuit arrangement of claim 1, wherein the plurality of functional units are coupled together by a first streaming data bus and a second streaming data bus, and wherein at least one of the first and second streaming data busses has a data width of at least that of the widest hardware module of any of the functional units of the circuit arrangement, for use as a test link.

4. The circuit arrangement of claim 3, wherein the switch matrices are configurable to connect a single one of the hardware modules to be tested between a second streaming data input and a second streaming data output associated with the second streaming data bus while detouring all of the other hardware modules of all functional units of the circuit arrangement.

5. The circuit arrangement of claim 3, wherein the switch matrices are configurable to establish a first streaming data path that streams processing data through the circuit arrangement and to establish a broadcast connection at an output of a hardware module, so that downstream of the hardware module, the streaming data are supplied to both the first streaming data path for a normal processing operation, and to the second streaming data bus for detecting test data from the hardware module.

6. The circuit arrangement of claim 1, wherein the hardware modules are selected from a group consisting of a hardware accelerator, a local memory and a local processor.

7. A method for testing integrated circuitry, comprising:
providing a circuit arrangement with a plurality of functional units that are coupled together by at least one streaming data bus, wherein each of the functional units comprise a plurality of hardware modules and a switch matrix, wherein the switch matrix has at least one streaming data input and at least one streaming data output and is connected between a streaming data input and a streaming data output of the respective functional unit and is further coupled to each of the hardware modules of the respective functional unit;
providing at least one of the streaming data busses with a data width of at least that of the widest hardware module of any of the functional units of the circuit arrangement;
configuring the switch matrices of the circuit arrangement to establish a streaming data path between and through the plurality of functional units; and
using the streaming data path as a test link for any of the hardware modules.

8. The method of claim 7, wherein the plurality of functional units are coupled by a single streaming data bus and the method further comprises:
configuring the switch matrices of the circuit arrangement to establish a streaming data path that passes from the streaming data input through a single one of the hardware modules that is to be tested and to the streaming data output while detouring all of the other hardware modules of all functional units of the circuit arrangement;
feeding a test sequence from the input to the hardware module to be tested; and
detecting test data at the streaming data output.

9. The method of claim 7, wherein the plurality of functional units are coupled by a first streaming data bus and a second streaming data bus and the method further comprises:
providing the second streaming data bus with a data width of at least that of the widest hardware module of any of the functional units of the circuit arrangement, for use as a test link.

10. The method of claim 9, further comprising:
configuring the switch matrices to connect a single one of the hardware modules to be tested between a second streaming data input and a second streaming data output while detouring all of the other hardware modules of all functional units of the circuit arrangement;
feeding a test sequence from the second streaming data input to the hardware module to be tested; and
detecting test data at the second streaming data output.

11. The method of claim 9, further comprising:
configuring the switch matrices to establish a first streaming data path and streaming processing data through the first streaming path;
configuring the switch matrices to establish a broadcast connection at an output of a hardware module to supply streaming data downstream of the hardware module to the first streaming data path for a normal processing operation, and to a second streaming data bus; and
detecting test data from the hardware module to be tested under real-time processing conditions at a trace output of the second streaming data bus.

12. The method of claim 7, wherein the configuration of the switch matrix in each individual functional unit is controlled by a local processor of the functional unit.

13. The method of claim 7, wherein the configuration of the switch matrices of the individual functional units is controlled by a controller of the circuit arrangement external to the functional units.

14. A circuit arrangement, comprising:
a plurality of functional units coupled together by one or more streaming data busses, wherein each of the plurality of functional units comprise:
a plurality of hardware modules that operate alone or together to provide a function of a respective one of the functional units;
a switch matrix operably associated with the plurality of hardware modules of a respective functional unit, and configured to provide a unique switching configuration to facilitate a flow of data through or around one or more of the plurality of hardware modules of the respective functional unit,
wherein each functional unit comprises a unit streaming data input and a unit data streaming output, and wherein the unit streaming data input of a first functional unit of the plurality of functional units comprises a streaming data input of the circuit arrangement, wherein the unit streaming data output of the first functional unit is coupled to a unit streaming data input of a next functional unit of the plurality of functional units via at least one of the one or more streaming data busses, wherein a unit streaming data output of a last functional unit of the plurality of functional units comprises a streaming data output of the circuit arrangement, and wherein a unit streaming data input of the last functional unit is coupled to a unit streaming data output of a previous functional unit of the plurality of functional units, and
wherein at least one of the streaming data busses has a data width of at least that of the widest hardware module of any of the functional units of the circuit arrangement to be configurable as a test link for any of the hardware modules.

15. The circuit arrangement of claim 14, further comprising a controller operably coupled to the switch matrix of each of the plurality of functional units, wherein the controller is configured to dictate the unique switching by providing control signals thereto to dictate a switching configuration of the respective switch matrix.

16. The circuit arrangement of claim 14, wherein each switch matrix is configured to selectively route data received at a respective unit streaming data input through one or more of the plurality of hardware modules for processing thereof and then to the respective unit streaming data output, or route the received data around the plurality of hardware modules directly to the respective unit streaming data output.

17. The circuit arrangement of claim 14, wherein each of a plurality of hardware modules of one functional unit performs a unique one or more tasks to collectively provide the function of the one functional unit.

* * * * *